(12) United States Patent
Zacharczuk

(10) Patent No.: US 12,442,534 B2
(45) Date of Patent: Oct. 14, 2025

(54) FOLDING GRILL

(71) Applicant: Konrad Zacharczuk, Rzeszow (PL)

(72) Inventor: Konrad Zacharczuk, Rzeszow (PL)

( * ) Notice: Subject to any disclaimer, the term of this patent is extended or adjusted under 35 U.S.C. 154(b) by 363 days.

(21) Appl. No.: 18/306,264

(22) Filed: Apr. 25, 2023

(65) Prior Publication Data

US 2023/0349558 A1 Nov. 2, 2023

(30) Foreign Application Priority Data

Apr. 29, 2022 (PL) .......................................... 441072

(51) Int. Cl.
*F24C 3/14* (2021.01)
*A47J 37/07* (2006.01)

(52) U.S. Cl.
CPC ............. *F24C 3/14* (2013.01); *A47J 37/0704* (2013.01); *A47J 2037/0777* (2013.01)

(58) Field of Classification Search
CPC .. A47J 37/0704; A47J 2037/0777; F24C 3/14
See application file for complete search history.

(56) References Cited

U.S. PATENT DOCUMENTS

| | | |
|---|---|---|
| 3,809,051 A | 5/1974 | Giroux |
| 4,885,988 A | 12/1989 | Lee |
| 5,333,540 A * | 8/1994 | Mazzocchi ......... A47J 37/0763 99/449 |
| 6,000,388 A * | 12/1999 | Andress ............. A47J 37/0718 126/25 AA |
| 7,934,494 B1 * | 5/2011 | Schneider ................. F24C 1/06 126/30 |
| 10,143,336 B2 | 12/2018 | Liu |
| 11,033,149 B2 | 6/2021 | Bartlett |
| 2015/0020796 A1 * | 1/2015 | Garman ............. A47J 37/0704 126/9 B |

FOREIGN PATENT DOCUMENTS

| | | |
|---|---|---|
| CN | 210582246 U | 5/2020 |
| CN | 213821081 U | 7/2021 |
| ES | 1000560 U | 3/1988 |
| ES | 1102306 Y | 5/2014 |
| WO | 9200034 A1 | 1/1992 |

* cited by examiner

*Primary Examiner* — Alfred Basichas

(57) ABSTRACT

The subject of the invention is a folding grill, which is characterized in that the front and rear walls of the bowl of the fireplace of this grill are swingingly connected to the upper ends of the front and rear wall of the left leg and right leg, that are essentially C-shaped, while the rear wall consisting of two connected to each other by hinges lower and upper parts and the side walls of the fireplace are connected by hinges to the side walls and the rear wall of the bowl, whereas the side walls are detachably connected to the rear wall by means of protrusions inseparably connected to the upper part of the wall, which are located in the vertical slots of the side walls, and in addition the upper part of the rear wall is connected by hinges to the cover.

17 Claims, 12 Drawing Sheets

FOLDING GRILL

FIELD OF THE INVENTION

The subject of the invention is a folding grill intended for heat treatment of food products in the open air, especially in the garden.

DESCRIPTION OF THE PRIOR ART

A grill folded into a suitcase-like shape, which allows for its convenient transport and storage, is known from the Spanish description of the utility model No. ES1000560U. The grill has a cuboidal frame resembling the letter "H" when viewed from the front, to which a tray is attached in the middle part intended for placing coal or firewood on it. At the same time, this tray is integrated with a system of chains to adjust its height and has many holes that improve aeration and combustion of coal or firewood. The grill is folded in such a way that the upper parts of the frame and the lower parts of the frame (legs) are folded through hinge connections towards the middle part of the frame (and the tray), resulting in a cuboid shape resembling a suitcase.

A grilling stove is also known from the U.S. Pat. No. 3,809,051A, which has a fireplace chamber covered by a special removable cover, a foldable chimney and legs. A removable water tank is mounted under the fireplace chamber, which allows you to pack the device into the trunk of the car while it is still hot (without damaging the trunk lining), and the tank also allows you to wash the dishes after preparing a meal. Folding the grill consists in disassembling it into its parts and placing it in its fireplace chamber resembling a suitcase.

A portable grill equipped with wheels for transporting it is also known from the U.S. Pat. No. 4,885,988A. This grill has a typical structure, whereas additionally has side plates, connected to the fireplace frame, on which various items used during grilling are placed. Raising the side plates allows the entire structure to be folded into a suitcase on wheels, whereas in order to fold the grill into this form, it must first be disassembled into its parts.

A portable grill is known from the U.S. Pat. No. 11,033,149B2, the fireplace chamber of which has four foldable side panels, each located on the side edge of the chamber. These panels can be unfolded outwards, so that they serve as shelves/table for various items used during grilling. In turn, after folding the side panels and folding the grill legs by their articulation towards the lower base of the fireplace, this grill is ready for transport in the form of a suitcase on wheels.

A foldable grill is also known from the Chinese Utility Model Description No. CN213821081U, the rectangular fireplace of which is pivotally connected to two symmetrically arranged load-bearing plates, which are used to support the unfolded grill, constituting its legs. In turn, the upper parts of this fireplace are connected by hinges to two rotating plates (which, when viewed from the front, resemble the letter "L"), which are shelves for accessories or food during use of this grill. In order to fold the grill, it is enough to fold the said load-bearing plates towards the bottom of the fireplace and fold the rotating plates towards the opening of the fireplace. When folded, the grill resembles a rectangular suitcase.

From the Spanish Utility Model Description No. ES1102306U a grill is also known, consisting of a body constituting its fireplace container, a two-piece grate equipped with a stand placed on side supporting flat bars, which are placed inside the body; supports (legs) pivotally attached to the lower part of the body and a two-piece cover pivotally attached to the side parts of the body. The grill can be folded into a suitcase-like form by rotating the side supporting flat bars towards the upper surface of the bottom of the body and the supports (legs) towards the lower surface of the body.

DESCRIPTION OF THE INVENTION

The purpose of the present invention is to develop a new, hitherto unknown, simple and compact structure of a folding grill, which folds into a rectangular shape, resembling a transport suitcase without the need to use additional tools during its unfolding and folding.

The term "hinge connection" used in the content of the patent description and patent claims should be treated as a connection between two parts that allows their rotational movement relative to each other and structurally it can be, for example, a connection of these parts with each other by a pin or a shaft that passes through the sleeves of these parts and/or their openings, while the "swing connection" should be treated as a connection between two parts that allows their rotational movement together with an additional linear movement relative to each other and structurally it can be, for example, a profiled connection, such as equipping one part with an arched hole along which moves a protrusion or profile element of the second part.

The folding grill according to the invention is characterized in that the front and rear walls of the fireplace bowl of this grill are swingingly connected to the upper ends of the front and rear walls of its left and right legs, which are essentially C-shaped, while the rear wall consisting of two hinged lower and upper parts, and the side walls of the fireplace are connected by hinges to the side walls and the rear wall of the bowl, whereas the side walls of the fireplace are detachably connected to its rear wall by means of protrusions inseparably connected to the upper part of this wall, which are located in the vertical slots of the side walls of the fireplace, and additionally the upper part of its rear wall is connected by hinges to the cover.

It is advantageous when the side walls of the bowl are connected to the side walls of the fireplace by means of cylindrical pins placed in the lugs of the upper corners of the bowl and in sleeves welded to the lower edges of the side walls of the fireplace, while the rear wall of the bowl is connected to the lower part of the rear wall of the fireplace by means of a cylindrical pin situated in the sleeves of the rear wall of the bowl and the sleeves of this lower part. In turn, both parts of the rear wall of the fireplace are connected with each other by means of a cylindrical pin located in the sleeves of the lower and upper part of this rear wall, while the upper part of the rear wall of the fireplace is connected to the cover by means of a cylindrical pin situated in the sleeves of this upper part and the sleeves of the cover.

It is also advantageous when the front and rear walls of the fireplace bowl are inseparably connected to arched connectors made with blind cavities for profiled elements, inseparably connected to the inner surface of the front and rear walls of both legs, and when the upper part of the rear wall in its vertical plane of symmetry has a profiled element with a hole coaxially situated with respect to the hole of the lower part of the rear wall of the fireplace, whereas a stabilizing screw with a flat handle is inserted in both of these holes.

In turn, to the inner surface of the rear and front walls of both legs, diagonally arranged arms of flat rectangular supports are attached by means of pins, whereas the left support has a rectangular offset with a round through hole made at its longer edge and a rectangular hole situated behind it, and the right support is ended with a rectangular cavity, the arms of which are bent upwards, and behind it a circular through hole is made, whereas in the coaxially situated to each other circular through holes a locking screw is placed, ending with a handle at the top. In addition, behind the rectangular through hole of the left support another circular through hole is made, and behind the circular through hole of the right support another circular through hole is also made.

In a preferred embodiment the side walls of the fireplace and the side walls of the bowl are connected to the shelf frames by means of a cylindrical pin situated in the lugs of the upper corners of the bowl, in the sleeves of the lower edges of the side walls of the fireplace and in the through holes of the horizontal elements of the shelf frame, whereas the horizontal elements of the shelf frame are situated in a cavity made between the two sleeves of the side walls of the fireplace, while the upper surface of the horizontal elements of the shelf frame, from the inner side of the fireplace, is inseparably connected to the plate adjacent to the inner surface of its side wall, and the lower parts of its rear wall have flat offsets adjacent to this plate.

The side walls of both legs in the upper part have coaxially situated to each other through holes, above which a magnet is glued to the inner surface of these walls, whereas the wheels are attached to the lower part of the side wall of the right leg, and at the upper corners of the side wall of the left leg two rectangular through recesses for these wheels are made, and between these recesses a flat slotted rectangular hole for the handle of the screw locking the supports is made, and in addition, a hook of the catch is attached to the lower middle part of the inner surface of this side wall, the catch being attached to the middle outer part of the right side wall of the bowl, and a telescopic handle with a grip is attached to the outer surface of the side wall of the left leg.

In turn, in the front wall of the cover, in its middle part, a blind recess is made with through holes for the guides of the handle equipped with a catch, while the middle outer part of the front wall of the bowl is equipped with a protrusion adapted to the shape of the catch of the handle of the cover, and in addition the middle parts of both side walls of this bowl have flat vertical offsets.

It is advantageous when the cover handle is equipped with a LED with a battery and a switch, and two profiled elements are inseparably attached to the upper inner edge of the rear wall of this cover, and hooks are attached to the corners of the inner surface of the upper wall of this cover.

In another preferred embodiment, the front wall of the bowl in its middle part is made with a rectangular blind recess with holes for the knobs of the gas distributor, which is connected by a gas hose with a valve fixed in the opening of the bottom of the bowl, and by further gas hoses with burners situated in this bowl, above which aromatizers are seated.

The structure of the grill according to the invention allows it to be folded and unfolded into a cuboid shape resembling a transport suitcase without the need to use additional tools for this activity, whereas the swing connection of the bowl of the grill fireplace with legs and the hinge connection of two parts (upper and lower) of the rear wall of the bowl with the rear wall and the side walls, as well as of the rear wall with the cover, and also the use of screws with a handle to stabilize the position of the grill leg supports and two parts of the rear wall of the grill fireplace makes its folding and unfolding easy, quick and intuitive. In addition, the grill folded into a form resembling a transport suitcase reduces the amount of space needed for its storage.

Thanks to equipping the right leg of the grill with wheels, and the left leg with a telescopic handle with a grip, it is possible to easily move the grill after its folding. In turn, the supports with which these legs are equipped strengthen and stiffen the grill structure after its unfolding, and thanks to the side shelves of the grill connected by hinges to the fireplace bowl it is easier to prepare meals. The supports and shelves can be used as a stand for typical tools or products used during grilling (for example paper towels, forks, plates).

In turn, the magnets of both legs of the grill, the hooks of the left leg and of the cover, the catches of the bowl and of the handle of the cover make it easier to fold the grill and stabilize its structure after folding the grill.

BRIEF DESCRIPTION OF THE FIGURES

The subject of the invention in two exemplary embodiments is shown in FIGS. 1-18, in which FIGS. 1-11—show the first embodiment of the folding grill, the fireplace bowl of which is adapted to thermal processing of food by means of solid fuel such as coal or firewood.

FIG. 13—the bowl of this grill, the left part of which is not equipped with aromatizers, in a perspective view from the right side, from the back and from above.

FIG. 14—the same bowl in a perspective view from the left side, from the front and from the bottom FIG. 15—the first stage of folding the grill according to the first embodiment into a form resembling a suitcase, which is after attaching the grate to its cover and during folding its rear wall, in a perspective view from the left side, from the front and from above.

DETAILED DESCRIPTION OF THE INVENTION

Figure 1:
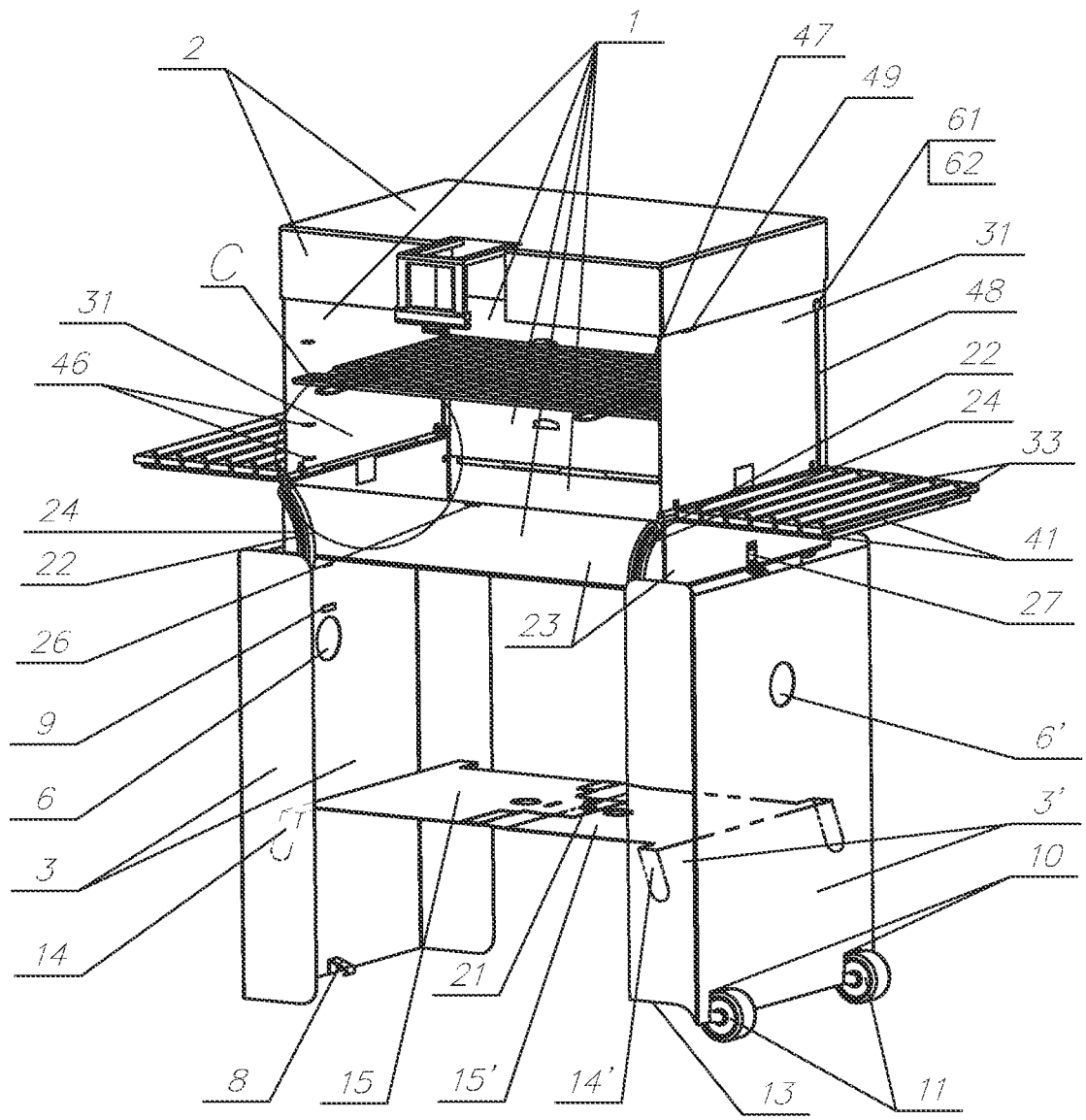
Figure 2:
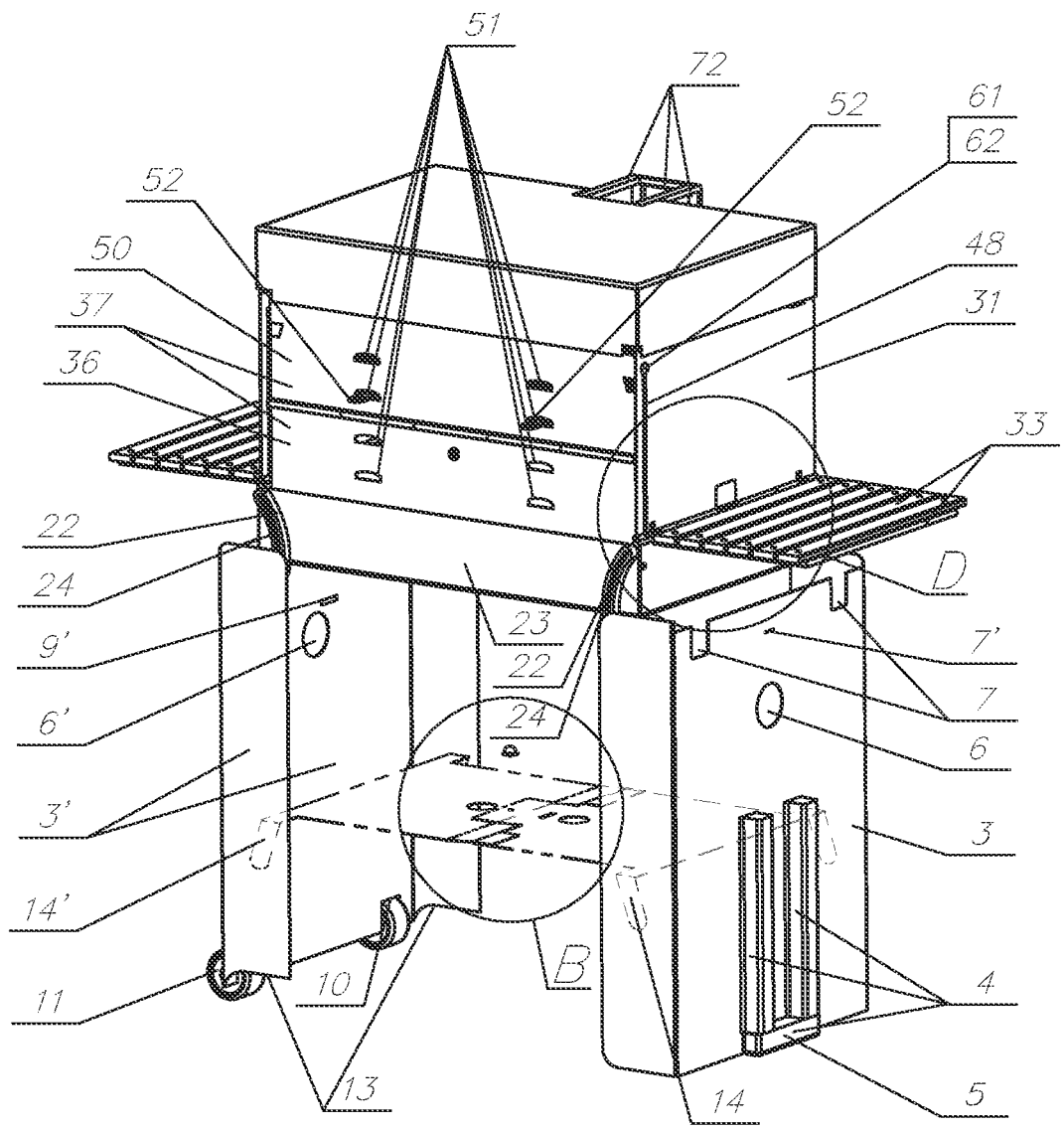
FIG. 2—the same grill in a perspective view from the left side, from the back and from above.
Figure 3:
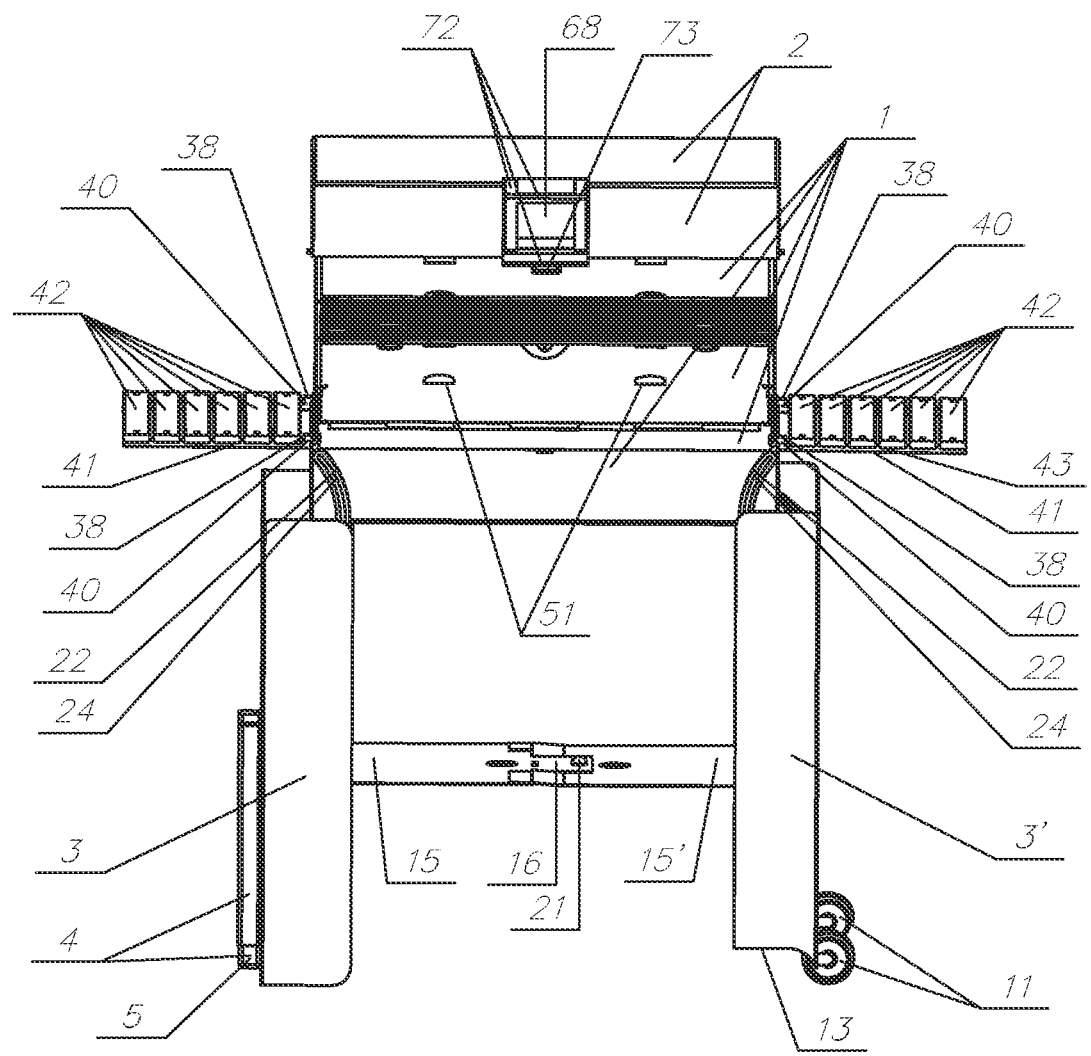
FIG. 3—the same grill in a perspective view from the front and from above
Figure 4:
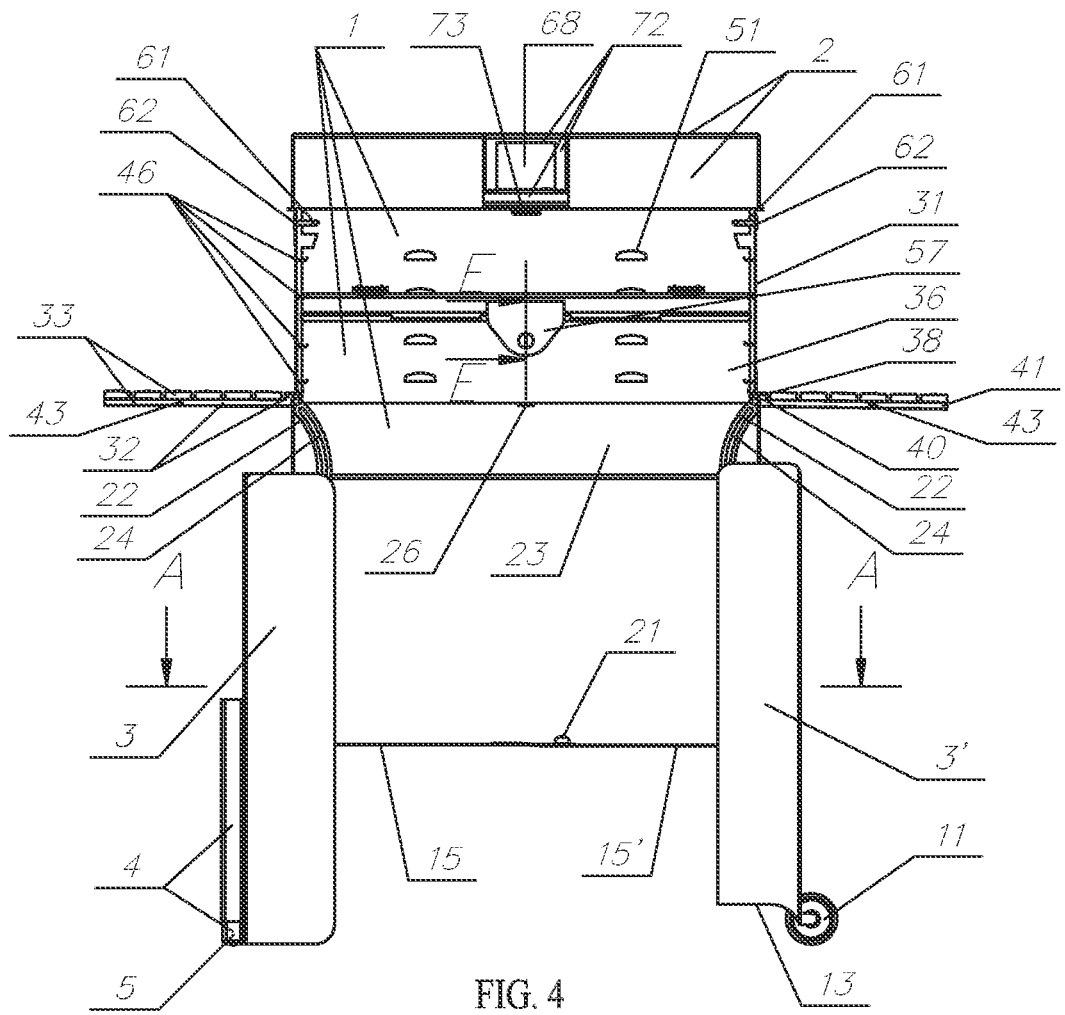
FIG. 4—the same grill in front view
Figure 5:
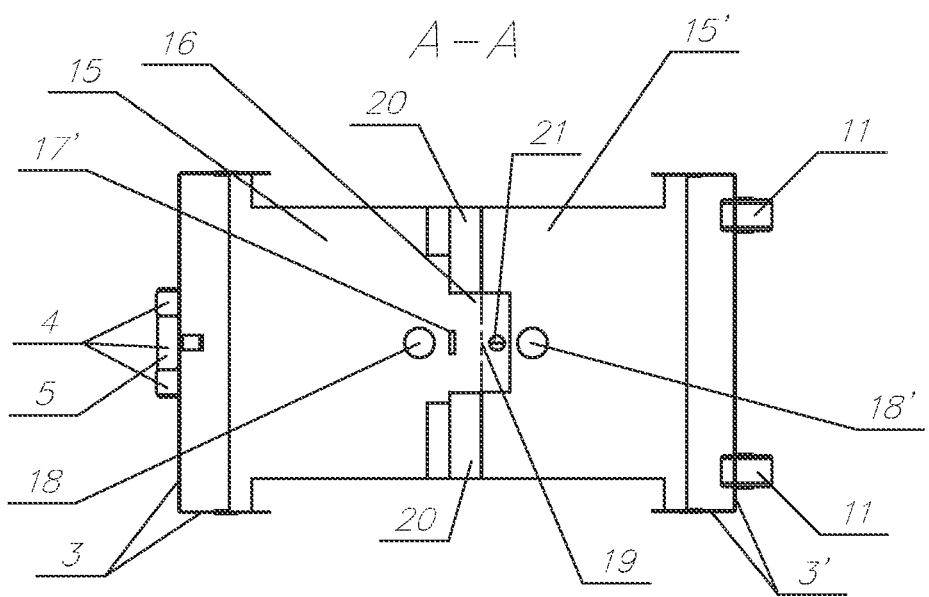
FIG. 5—the same grill in a horizontal cross section along the line A-A
Figure 6:
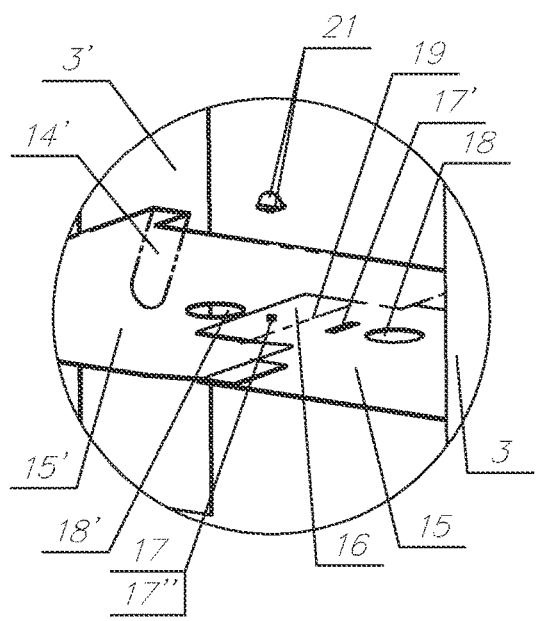
FIG. 6—enlarged detail B of both leg supports of this grill in a perspective view from the left side, from the back and from above.
Figure 7:
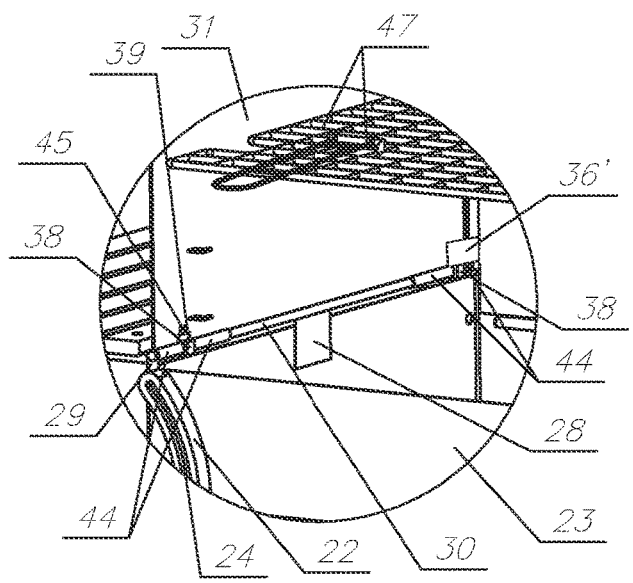
FIG. 7—enlarged detail C of the hinge connection of the fireplace bowl of this grill with its left shelf and side wall, in a perspective view from the right side, from the front and from above.
Figure 8:
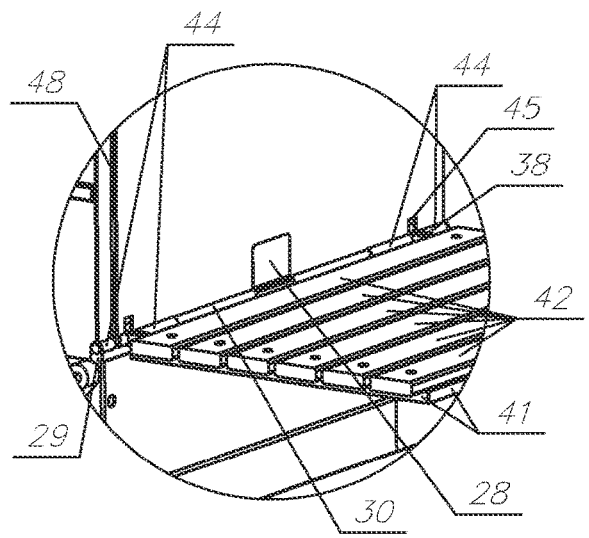
FIG. 8—enlarged detail D of the hinge connection of the fireplace bowl of this grill with its right shelf and side wall, in a perspective view from the left side, from the back and from above.
Figure 9:
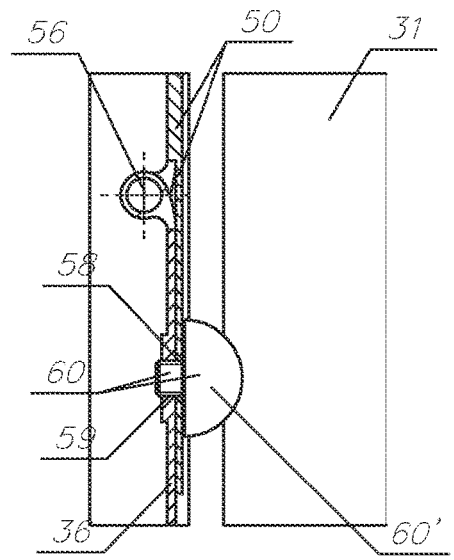
FIG. 9—an enlarged vertical cross section along the line E-E showing the hinge connection of the upper and lower part of the rear wall of this grill together with the stabilizing screw.
Figure 10:
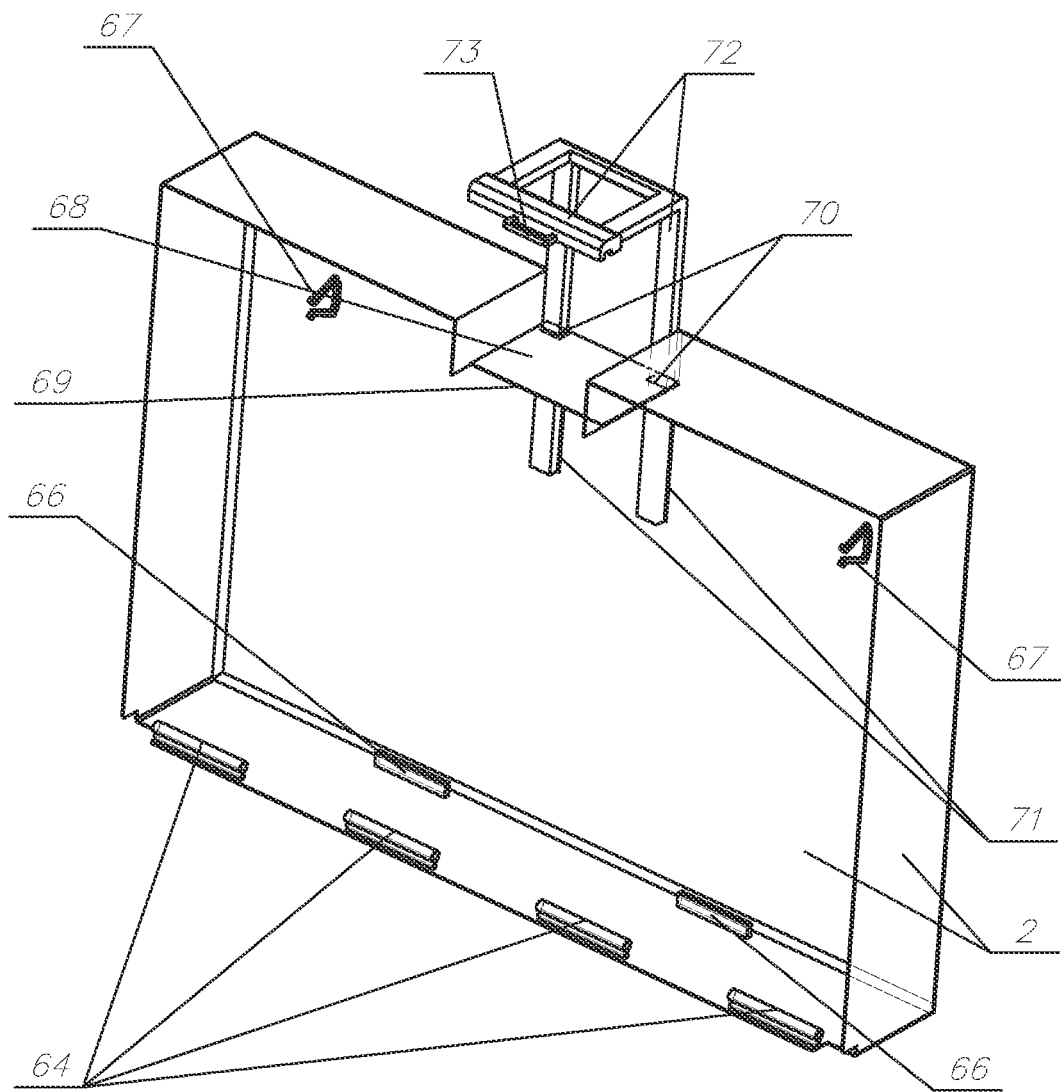
FIG. 10—the fireplace cover of this grill in a perspective view from the right side, from the front and from the bottom FIG. 11—the same grill in the unfolded state of its components in a perspective view from the left side, from the front and from above FIG. 12—shows the second embodiment of this grill in a perspective view from the right side, from the front and from above.
Figure 11:
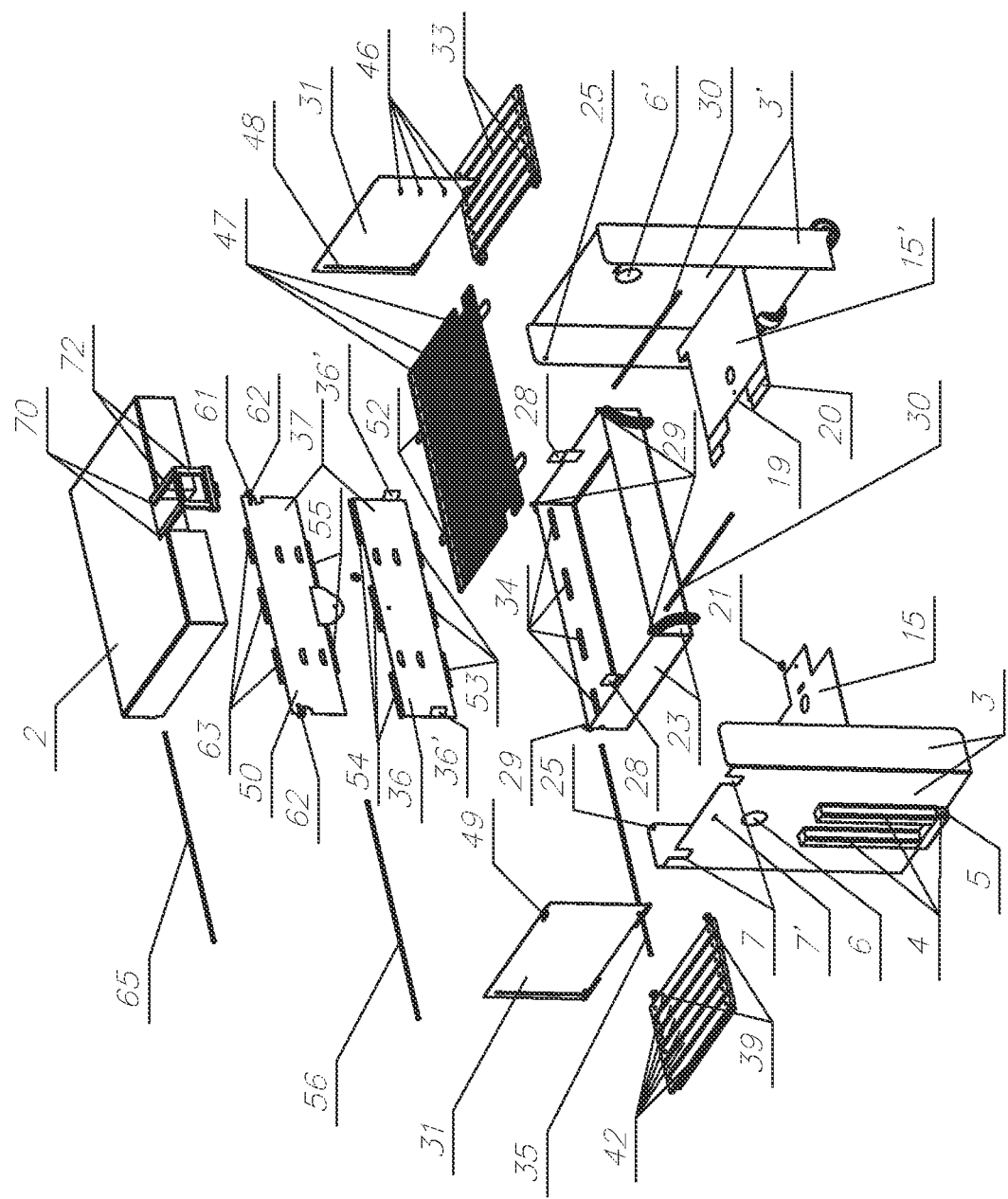

The invention should not be limited to the embodiments described below, as it may also be embodied in other forms. The embodiments are presented so that the disclosure of the invention is full and complete and fully conveys the scope of the invention to those skilled in the art.

Summing up, the following embodiments do not exhaust all possible solutions falling within the scope of the invention.

The folding grill according to the first embodiment, shown in FIGS. 1-11, consists of a rectangular fireplace 1 open from the front, which is covered from above with a sheet metal cuboidal cover 2 connected to it by hinges, whereas the lower part of the fireplace 1 being connected to swinging legs made of sheet metal, the left leg 3 and the right leg 3', having the shape of the letter "C" in cross-section, the front and rear narrower walls of which are oriented inwardly and are perpendicularly situated to the side walls of the legs 3 and 3'.

To the outer surface of the side wall of the left leg 3, in its lower middle part, a downwardly oriented telescopic two-armed metal handle 4 is welded, ended with a horizontally situated grip 5, and in the upper part of this wall there is a circular through hole 6, and at its upper corners two rectangular through recesses 7 are made between which a flat slotted rectangular hole 7' is made. In turn, a metal hook 8 is welded to the lower middle part of the inner surface of this side wall, and a rectangular magnet 9 is glued above the through hole 6 to the upper middle part of this wall.

The outer surface of the side wall of the right leg 3' of the grill in its lower part at its corners is made with two rectangular recesses 10 in which wheels 11 are mounted, while the middle upper part of this wall is made with a circular through hole 6' coaxially situated to the through hole 6 of the side wall of the leg 3, above which a rectangular magnet 9' is glued to the upper front part of the inner surface of this side wall, and the front and rear walls of the leg 3' are ended with an arched recess 13.

To the inner surface of the rear and front walls of both legs 3 and 3', the obliquely situated arms 14 and 14' of the flat sheet metal rectangular left support 15 and the right support 15' are attached by means of pins not shown in the drawing, whereas the left support 15 has a rectangular offset 16 with a circular through hole 17 made on its long edge and a rectangular hole 17' situated behind it, behind which a round through hole 18 is made with a diameter smaller than the through hole 6 of the side wall of the left leg 3. In turn, the right support 15' of the right leg 3' is ended with a rectangular cavity 19, behind which a circular through hole 17" is made, and behind it there is another circular through hole 18' with a diameter smaller than the through hole 6' of the side wall of the right leg 3', whereas the front ends of the arms 20 of the rectangular cavity 19 are slightly bent upwards so that in the unfolded position of the supports 15 and 15' the rectangular offset 16 of the left support 15 is situated in the cavity 19 of the right support 15' and it is partially supported on the right support 15', and the ends of the arms 20 of this support partially overlap the support 15, and in the holes 17 and 17" coaxially situated to each other a locking screw 21 is screwed, ended from the top with a flat handle, which additionally stabilizes the supports 15 and 15' in a horizontal position.

The upper extreme ends of the rear and front walls of both legs 3 and 3' are swingingly connected by means of sheet metal arched connectors 22 welded at the side edges of the front and rear walls of the cuboid sheet metal bowl 23 of the fireplace 1 for placing coal or firewood in it, whereas each of the connectors 22 has a blind arched cavity 24 for a profiled element 25 moving along it, welded to the inner surface of the front and rear wall of the leg 3 and 3', respectively.

A sheet metal protrusion 26 is welded to the upper middle outer part of the front wall of the bowl 23 of the fireplace 1, and a catch 27 is attached to the lower middle outer part of its right side wall by means of rivets, not shown in the drawings, and from the upper edges of both side walls of the bowl 23 vertical sheet metal flat offsets 28 protrude from their middle parts, and all upper corners of the bowl 23 are ended with lugs 29 having a profile of the inverted shape of the letter "U", for cylindrical pins 30 connecting the side walls of the bowl 23 with the sheet metal rectangular side walls 31 of the fireplace 1 and the sheet metal frames 32 of the side shelves 33 of this grill, while four sleeves 34 are welded to the inner surface of the rear wall of the bowl 23, for a cylindrical pin 35 connecting this wall to the lower part 36 of the two-piece rear wall 37 of the fireplace 1.

Each frame 32 of the shelf 33 consists of two horizontal elements 38 (rear and front) ended with a through hole, not shown in the drawing, through which a pin 30 passes and which have, on the upper surface from the inner side of the fireplace 1, a matching flat plate 39 adjoining the inner surface of the side wall 31 of the fireplace 1, and from the outer side (outside the fireplace 1) are connected to the upper end of the vertical elements 40, the lower ends of which are connected to the profile 41 having the shape of the letter "C" in the top view. In addition, wooden slats 42 are screwed to the upper surface of the profile 41 of each frame 32, whereas a sheet metal hook 43 is screwed to the front end of the middle slat 42.

In turn, to the lower edges of the side walls 31 of the fireplace 1, in both their corners, two sleeves 44 are welded for the pin 30, between which a rectangular cavity 45 is made, in which a horizontal element 38 of the frame 32 of the shelf 33 is placed, while on the inner surface of the side walls 31, in their front part, upwardly situated, equidistant to each other, horizontal arched protrusions 46 are situated, on which a typical grill grate 47 is seated, while in the rear part both walls 31 are made with a vertical slot 48 passing through the rear sleeve 44, and a rectangular plate 49 is welded to the outer upper front part of the walls 31, on which the cover 2 is seated.

The rear wall 37 of the fireplace 1 consists of a sheet metal rectangular lower part 36 and a sheet metal rectangular upper part 50 connected to it by hinges with two vertically located and equidistant flat profiled recesses 51 made on their both sides, into which the U-shaped catch elements 52 are inserted of the back part of the grill grate 47. Three identical sleeves 53 are welded to the lower edge of the lower part 36 of the rear wall 37, the spacing of which matches the spacing of the sleeves 34 of the rear wall of the bowl 23 between which they are placed and through which the pin 35 passes forming a hinge connection of the bowl 23 with the lower part 36 of the rear wall 37 of the fireplace 1, while the upper edge of the lower part 36 of the rear wall 37 also ends with three sleeves 54 located at equal distances from each other, between which two sleeves 55 of the lower edge of the upper part 50 of the rear wall 37 are placed, whereas in the sleeves 54 and 55 a cylindrical pin 56 is inserted, also forming a hinge connection of the two parts in this way. In addition, the side edges of the lower part 36 of the rear wall 37 have flat offsets 36' which adjoin to the plate 39 of the rear horizontal element 38 of the frame 32 of the shelf 33, stabilizing the structure of the fireplace 1, while the lower edge of the upper part 50 of the rear wall 37 between its two sleeves 55 in a vertical plane of the symmetry of this wall is provided with a "V"-shaped sheet metal element 57 with a hole 58 situated coaxially to a hole 59 made in the lower part 36 of the rear wall 37, whereas in the holes 58 and 59 a screw 60 is screwed ended from the top with a flat handle 60', stabilizing vertical position of both parts of the rear wall 37.

In the upper side corners of the front surface of the upper part 50 of the rear wall 37, two cylindrical protrusions 61 in the shape of the letter "L" are welded, ended with a round plate 62 with larger diameter, which are located in the vertical slot 48 of the side walls 31. In turn, to the upper edge of the upper part 50 of the rear wall 37, three sleeves 63 are welded, equidistantly spaced from each other, which are placed between four sleeves 64 welded to the rear wall of the cover 2, whereas through the sleeves 63 and 64 a cylindrical pin 65 passes, connecting by hinges the upper part 50 of the rear wall 37 to the cover 2.

Two rectangular elements 66 are welded to the upper inner edge of the rear wall of the cover 2, for the grate 47 attached to the hooks 67 welded at the corners of the inner surface of the upper wall of the cover 2 (in the folded position of the grill). In turn, the front wall of the cover 2 in its middle part is bent inwards, creating a rectangular blind recess 68 with a rectangular cavity 69 made in it in its lower part, whereas in the upper part of this recess 68 two elongated through holes 70 are made, in which horizontal metal guides 71 of the handle 72 with a catch 73 are placed, in which a sheet metal flat protrusion 26 of the bowl 23 is placed (in the folded position of the grill).

Figure 12:
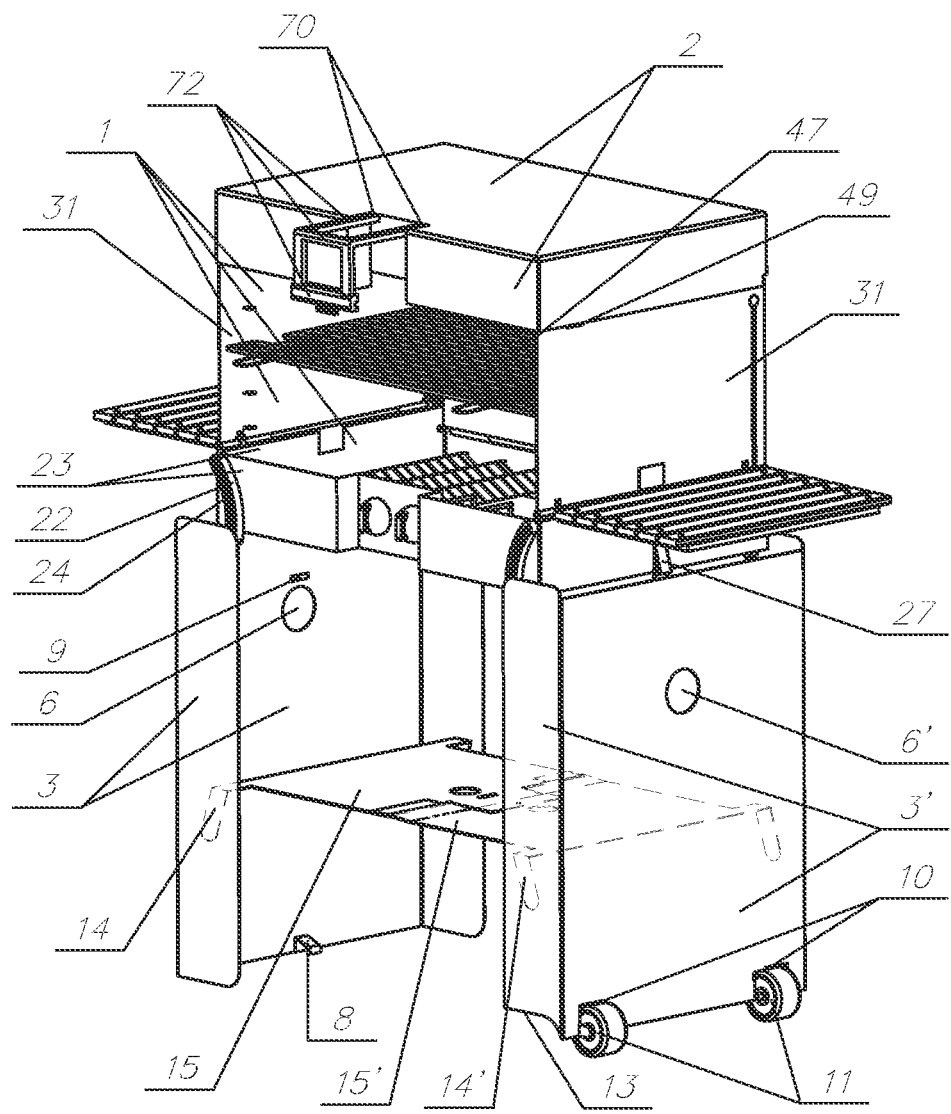
FIGS. 12-14 show the second embodiment of the folded grill, the fireplace bowl of which is adapted to thermal processing of food by means of a gaseous fuel such as natural gas, and FIGS. 15-18—show the method of folding the grill made according to its first embodiment, whereas FIG. 1—shows the first embodiment of this grill in a perspective view from the right side, from the front and from above.
Figure 13:
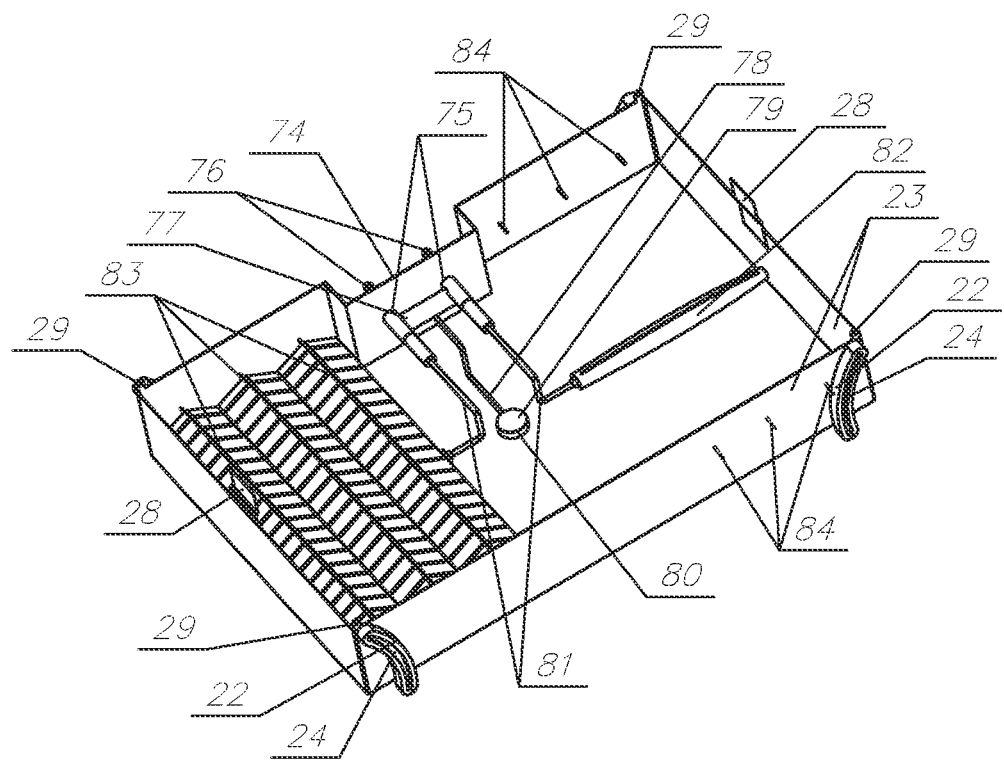
Figure 14:
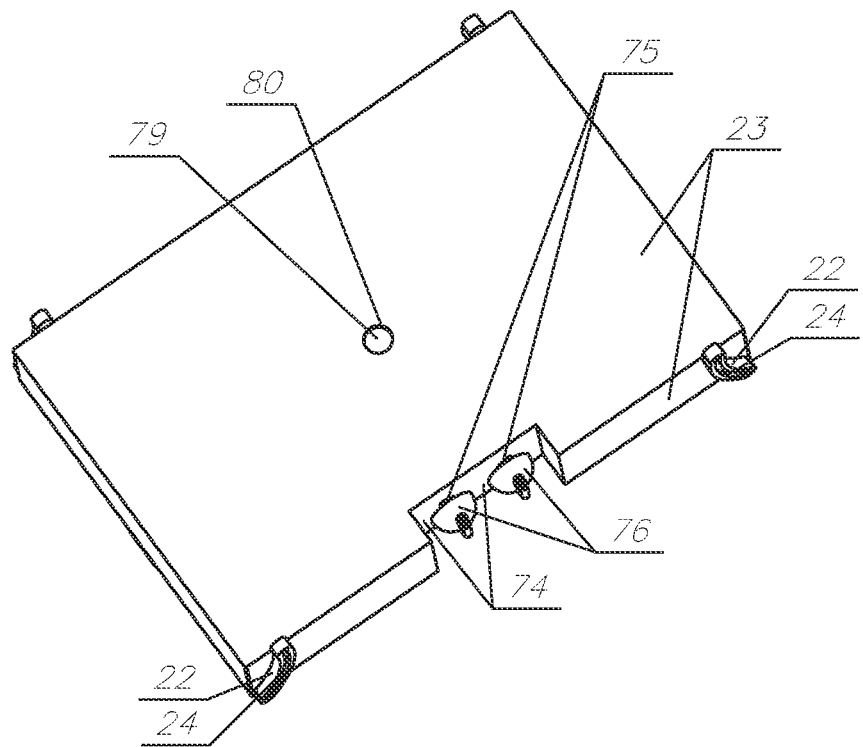

The grill according to the second embodiment, shown in FIGS. 12-14, adapted for thermal processing of food by means of gaseous fuel, has a structure similar to the grill according to the first embodiment shown in FIGS. 1-11, and the difference between both of these embodiments is that in the latter embodiment, the front wall of the bowl 23 in its middle part has a rectangular blind recess 74 with two holes 75 in which knobs 76 connected to the gas distributor 77 are seated, the central part of which is connected by a gas hose 78 with a valve 79 fixed in a through hole 80 made in the central part of the bottom of the bowl 23, while both side parts of this distributor 77 are connected by gas hoses 81 with one end of typical elongated grill burners 82, the other ends of which are welded to the side walls of the bowl 23 and above which there are typical sheet metal aromatizers 83 of the grill, mounted on cylindrical protrusions 84 welded to the front and rear walls of the bowl 23.

It will be appreciated that the foldable grill bowl 23 may have one, four, five or more knobs 76 connected to the distributor 77, which is sequentially connected by gas hoses 81 to one, four or five burners 82.

In another embodiment of the grill according to the invention not shown in the figure, the handle 72 was equipped with a LED having a battery and a switch, which, when activated, makes visual control of the thermally processed food easier.

Figure 15:
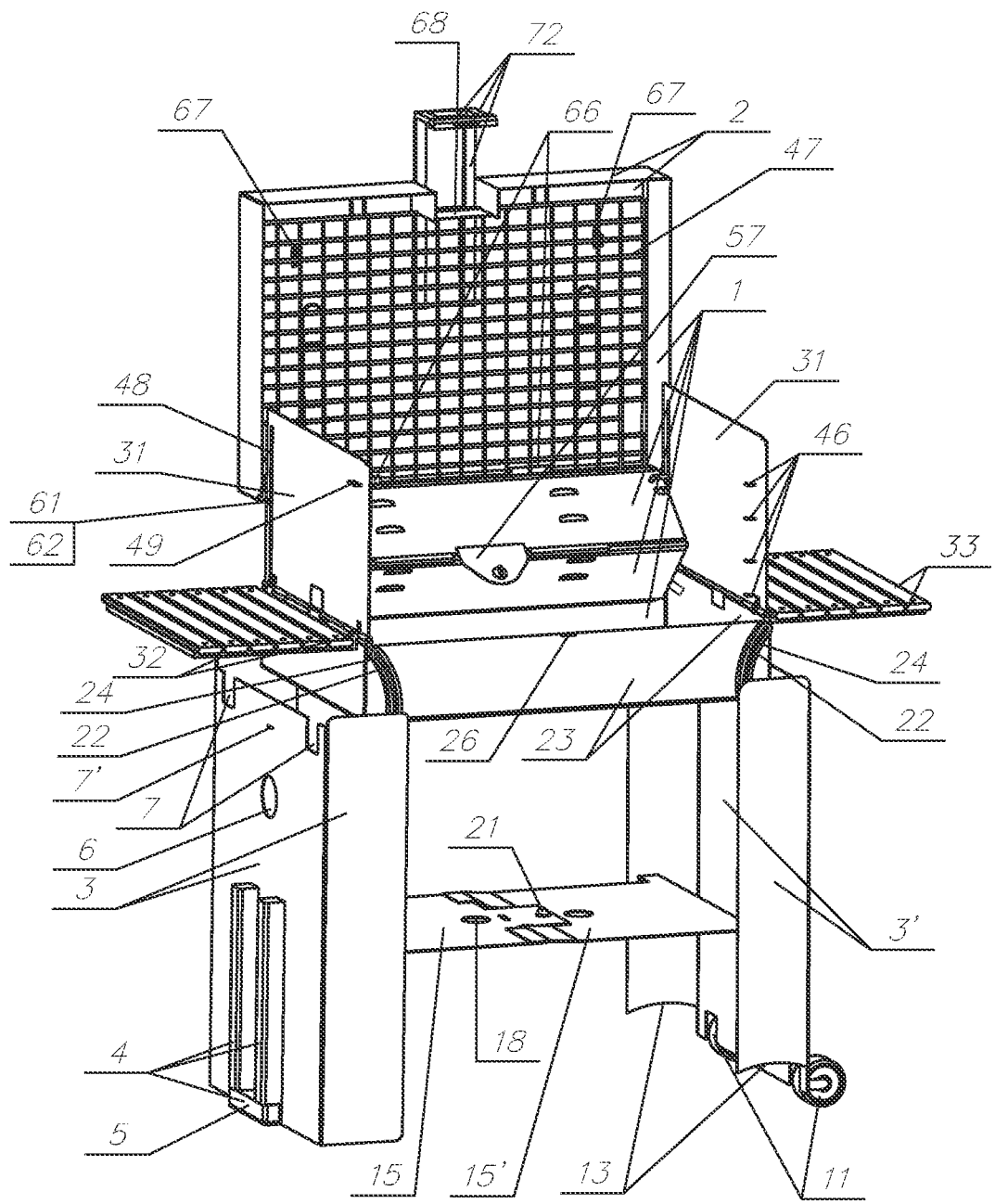
Figure 16:
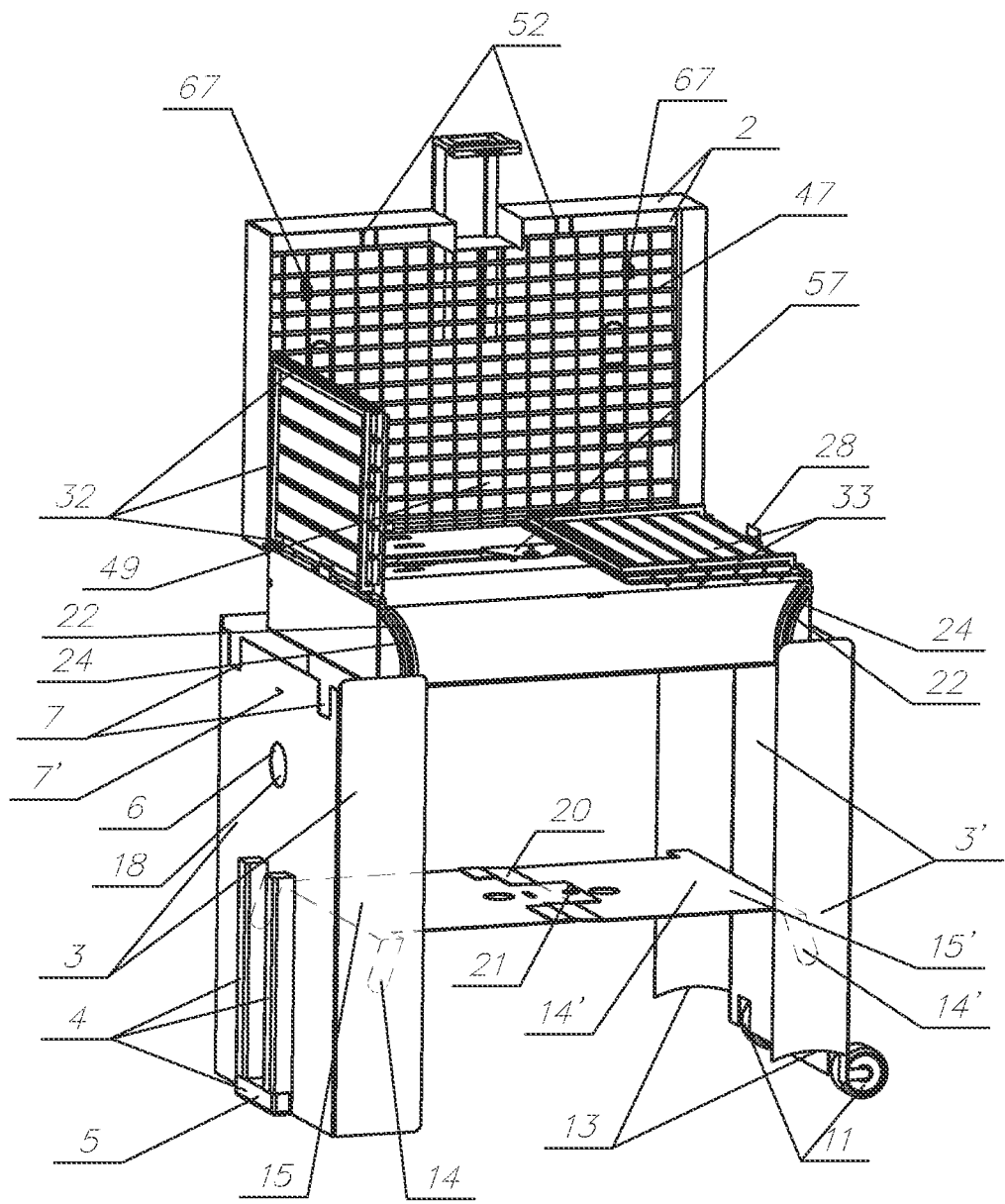
FIG. 16—the second stage of folding this grill after folding its rear wall and right-side wall with a shelf and the left support of the left leg, and during the folding of the left shelf with the left side wall and the right support of the right leg, in a perspective view from the left side, from the front and from above.
Figure 17:
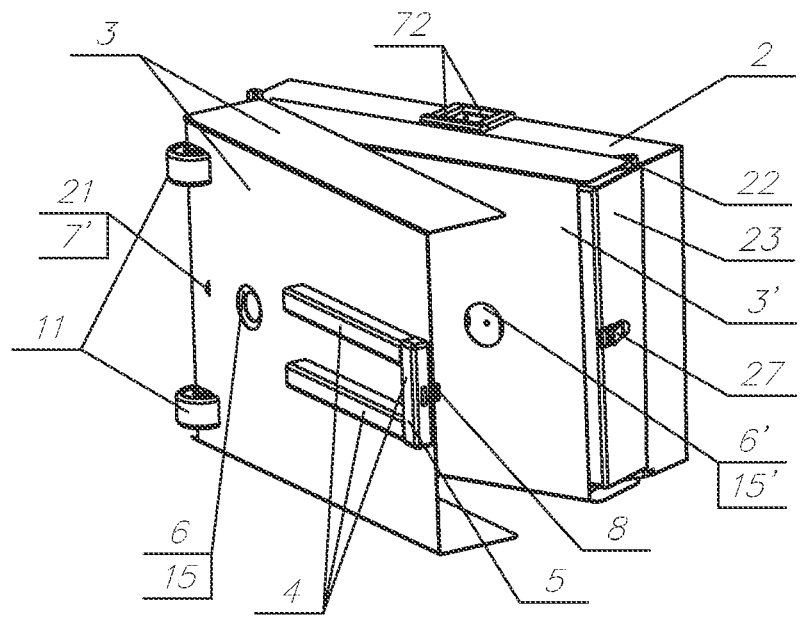
FIG. 17—the third stage of folding this grill after folding its walls, shelves and the right leg, and during folding its left leg and the cover with grate, in a perspective view from the left side, from the front and from above, and FIG. 18—the same grill after its folding into a form resembling a transport suitcase, in a perspective view from the right side, from the front and from above.
Figure 18:
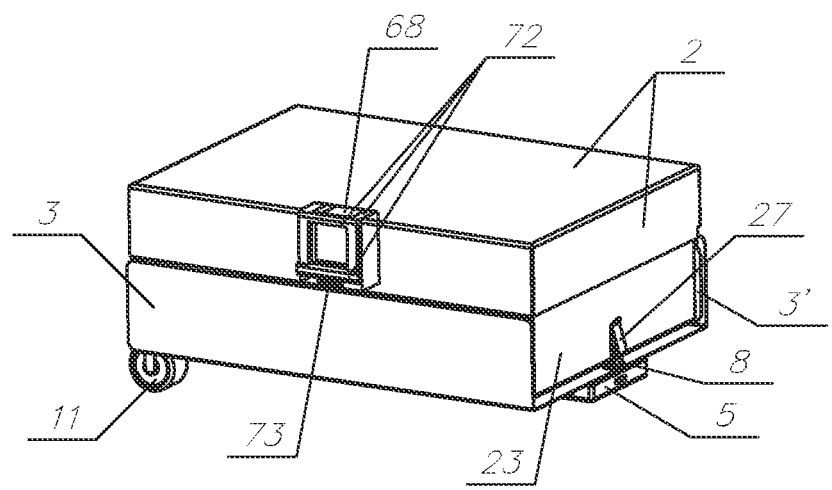

In order to fold the grill into a form resembling a transport suitcase, the cover 2 is tilted backwards, then the grate 47 is removed from the bowl 23 and placed on the rectangular elements 66 of the rear wall of the cover 2 and on the hooks 67 of the upper wall of this cover. Then, from the holes 58 and 59 of the rear wall 37 of the fireplace 1, the screw 60 is removed by means of its handle 60', which enables folding of this rear wall 37 by tilting its upper part 50 and lower part 36 so that their hinge connection is moved towards the inside of the bowl 23, and the protrusions 61 of the upper part 50 move downwards along the slot 48 of the side walls 31 (as shown in FIG. 15). After folding the rear wall 37 and placing it over the inside of the bowl 23 in a position parallel to the bottom of the bowl, the side shelves 33 of the grill are tilted inside the bowl 23 so that they are also parallel to the bottom of the bowl 23, whereas during the tilting of the shelves 33 their horizontal elements 38 and vertical elements 40 pass through the cavities 45 of the side walls 31, and the wooden slats 42 pass over the offsets 28 of the bowl 23 so that the slats 42 adhere to the outer surfaces of the walls 31, after which the shelves 33 together with the wall 31 lean further to their position parallel to the bottom of the bowl 23 (as shown in FIG. 16), then the cover 2 is closed, and the guides 71 of the handle 72 are inserted through the through holes 70 to the inside of this cover, so that the handle 72 is matched with the front wall of the cover 2. Such position of the bowl 23, covered from above by the cover 2, is maintained as a result of placing the flat protrusion 26 in the catch 73 of the handle 72 of the cover 2. The grill folded to this form is placed on the rear wall of the bowl 23 and the rear wall of the cover 2, and the locking screw 21 is removed from the holes 17 and 17" by means of its handle and the supports 15 and 15' are folded towards the inner side surfaces of the legs 3 and 3' with magnets 9 and 9', by pivoting these supports on their arms 14 and 14', whereas at time of folding the left support 15, the handle of the screw 21 is seated in the hole 7' of the left leg 3. Then, the right leg 3' is folded in rotation by sliding its profiled elements 25 along the blind arched cavities 24 of the arched connectors 22 of the bowl 23 towards the bottom of this bowl, and then the left leg 3 is similarly folded so that the wheels 11 of the right leg 3' are situated in rectangular through recesses 7 of the upper surface of the side wall of the left leg 3 (as shown in FIG. 17). The position of these legs is locked by the hook 8 seated on the catch 27. The grill folded in this way is transported by the user on wheels 11, by pulling the grip 5 from the lower part of the left leg 3 (as shown in FIG. 18).

In turn, in order to unfold the grill, the above steps are performed in the reverse order.

What is claimed is:
1. A folding grill comprising:
    a right leg and a left leg, wherein the right leg and the left leg are C-shaped;
    a fireplace assembly comprising:

a bowl enclosed by three walls, wherein the bowl is configured to support at least a portion of a grate and at least a portion of a cover;
a front wall and a rear wall connected to the bowl; and
a pair of side walls hingedly connected to corresponding side walls and of the bowl, wherein:
the right leg and the left leg are connected to the fireplace assembly;
the front wall of the bowl is configured to be swingingly connected to upper ends of the right leg and the left leg;
the rear wall of the bowl is configured to be swingingly connected to upper rear ends of the right leg and the left leg;
the rear wall comprises an upper part and a lower part, wherein the upper part and the lower part are connected to each other by one or more hinges;
the upper part and the lower part are operably connected to the pair of side walls of the fireplace by one or more hinges;
the upper part of the rear wall is operably connected to the cover by one or more hinges;
the lower part of the rear wall is operably connected to a rear wall of the bowl by one or more hinges; and
the pair of side walls of the fireplace assembly are detachably connected to the rear wall by one or more protrusions disposed towards an upper portion of the upper part of the rear wall, wherein the one or more protrusions are received by vertical slots defined by the pair of side walls of the fireplace.

2. The grill according to claim 1, wherein the pair of side walls of the bowl are connected to the pair of side walls of the fireplace by first cylindrical pins, wherein the first cylindrical pins are positioned in lugs of upper corners of the bowl and first sleeves, wherein the first sleeves are welded to the lower corner of the side walls of the fireplace;
the rear wall of the bowl is connected to the lower part of the rear wall by second cylindrical pins, wherein the second cylindrical pins are positioned in second sleeves of the rear wall of the bowl and in third sleeves of the lower part;
the lower part and the upper part of the rear wall of the bowl are connected to each other by means of one or more third cylindrical pins, wherein:
the one or more third cylindrical pins are positioned in fourth sleeves of the lower part of the rear wall; and
the one or more third cylindrical pins are positioned in fifth sleeves of the upper part of the rear wall;
the upper part of the rear wall of the fireplace is connected to the cover by means of a one or more fourth cylindrical pins, wherein:
the one or more fourth cylindrical pins are positioned in sixth sleeves of the upper part of the rear wall; and
the one or more fourth cylindrical pins are positioned in seventh sleeves of the cover.

3. The grill according to claim 1, wherein the front wall and the rear wall of the bowl are connected to arched connectors, wherein the arched connectors define first blind cavities for receiving first profiled elements connected to an inner surface of the front and the rear wall of the left leg and the right leg.

4. The grill according to claim 1, wherein the upper part of the rear wall in its vertical plane of symmetry has a second profiled element with a first hole coaxially located with respect to a second hole of the lower part of the rear wall.

5. The grill according to claim 4, wherein a stabilizing screw with a flat handle is located in the first hole and the second hole.

6. The grill according to claim 1, wherein a flat rectangular right support and a flat rectangular left support are provided with arms that are diagonally disposed, wherein the arms are operably attached to an inner surface of the corresponding front wall and rear wall of the right leg and left leg, wherein the flat rectangular left support is provided with a rectangular offset with a first circular through hole provided along a longitudinal edge and a first rectangular hole positioned behind the first circular through hole wherein the flat rectangular right support is provided with a rectangular cavity, wherein the arms of the flat rectangular right support are bent upwards, behind which a second circular through hole is provided.

7. The grill according to claim 6, wherein in the first circular through hole, and the second circular hole, are coaxially disposed, wherein a locking screw with a handle is inserted through the first circular through hole and the second circular hole.

8. The grill according to claim 6, wherein a third circular through hole is provided behind the first rectangular through hole of the flat rectangular left support, and a fourth circular through hole is provided behind the second circular through hole of the flat rectangular right support.

9. The grill according to claim 1, wherein the side walls of the fireplace and the side walls of the bowl are connected to frames of shelves by means of a first cylindrical pins placed in lugs of upper corners of the bowl, and in first sleeves of lower edges of the side walls of the fireplace and in through holes of horizontal elements of frame of the shelf.

10. The grill according to claim 9, wherein the horizontal elements of frame of the shelf are placed in a cavity defined between the two first sleeves of the side wall of the fireplace.

11. The grill according to claim 9, wherein upper surface of the horizontal elements of the frame of the shelf from an inner side of the fireplace is connected to a plate adjacent to an inner surface of the side wall of the fireplace, and the lower parts of the rear wall are provided with flat offsets adjacent to the plate.

12. The grill according to claim 1, wherein upper portions of the side walls of the left leg and the right leg are each provided with a fifth through hole and a sixth through hole, wherein the fifth through hole and the sixth through hole are arranged coaxially , wherein:
a magnet is attached above the fifth through hole and the sixth through hole on the inner surface of the respective side walls;
one or more wheels are attached to a lower portion of the side wall of the right leg;
one or more rectangular through recesses are provided towards the upper portion of the side wall of the left leg, wherein the one or more rectangular through recesses are configured to receive atleast a portion of the one or more wheels;
a flat slotted rectangular hole is provided between the one or more rectangular through recesses, wherein the flat slotted rectangular hole is configured to receive atleast a portion of the locking screw handle;
bottom middle part of the inner surface of the side wall of the left leg is provided with a hook;
a middle outer part of the side wall is provided with a first catch , wherein the first catch is configured to receive the hook; and
a second telescopic handle with a grip is attached to an outer surface of the side wall of the left leg.

13. The grill according to claim 1, wherein a first blind recess with seventh through hole is provided in central part of the front wall of the cover, wherein the seventh through hole is configured to operably receive guides of a third handle equipped with a second catch.

14. The grill according to claim 13, wherein a central outer part of the front wall of the bowl is equipped with a protrusion adapted to the shape of the second catch of the third handle of the cover, wherein middle parts of both side walls of the bowl are provided with flat vertical offsets.

15. The grill according to claim 13, wherein the second handle is equipped with a LED, a battery, and a switch.

16. The grill according to any of claim 1, wherein:
a pair of profiled elements are attached to an upper inner edge of the rear wall of the cover; and
a one or more hooks are attached to corners of an inner surface of the upper wall of the cover.

17. The grill according to claim 1, wherein a second rectangular blind recess with third holes is provided in a central part of the front wall of the bowl, wherein:
the third holes are configured to receive knobs of gas distributor;
the gas distributor is connected by a gas hose to a valve fixed in a fourth hole of the bottom of the bowl; and
the gas distributor is connected to burners located in the bowl, over which aromatizers are seated by the gas hoses.

* * * * *